(12) United States Patent
Kang et al.

(10) Patent No.: US 11,654,973 B2
(45) Date of Patent: May 23, 2023

(54) VEHICLE BODY STRUCTURE FOR REINFORCING POP-UP SEAT MOUNTING PART

(71) Applicants: Hyundai Motor Company, Seoul (KR); Kia Corporation, Seoul (KR)

(72) Inventors: Chang Hak Kang, Hwaseong-si (KR); Seung Hyun Kang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 40 days.

(21) Appl. No.: 17/466,633

(22) Filed: Sep. 3, 2021

(65) Prior Publication Data

US 2022/0161862 A1    May 26, 2022

(30) Foreign Application Priority Data

Nov. 25, 2020    (KR) .......................... 10-2020-0159501

(51) Int. Cl.
| | |
|---|---|
| B62D 25/08 | (2006.01) |
| B62D 25/20 | (2006.01) |
| B62D 25/02 | (2006.01) |
| B60R 22/22 | (2006.01) |
| B62D 27/02 | (2006.01) |
| B60N 2/015 | (2006.01) |

(52) U.S. Cl.
CPC .......... *B62D 25/2027* (2013.01); *B60R 22/22* (2013.01); *B62D 25/025* (2013.01); *B62D 25/087* (2013.01); *B62D 25/2036* (2013.01); *B62D 27/023* (2013.01); *B60N 2/015* (2013.01)

(58) Field of Classification Search
CPC ............ B62D 25/2027; B62D 25/2036; B62D 25/20; B62D 25/00; B62D 27/023
USPC .......................... 296/203.01, 4, 193.08, 204
See application file for complete search history.

(56) References Cited

U.S. PATENT DOCUMENTS 7,347,475 B2 *    3/2008    Ikemoto ............... B62D 25/087
                                                   296/37.16

FOREIGN PATENT DOCUMENTS

| CN | 103717482 B | * | 3/2016 | ............. B62D 25/08 |
| DE | 19507767 C2 | * | 4/1999 | ............. B62D 21/02 |
| JP | 2004217151 A | * | 8/2004 | ........... B60N 2/3011 |
| JP | 5510295 B2 | * | 6/2014 | |
| KR | 100521881 B1 | | 10/2005 | |

* cited by examiner

*Primary Examiner* — Dennis H Pedder
(74) *Attorney, Agent, or Firm* — Slater Matsil, LLP

(57) ABSTRACT

A vehicle body structure for reinforcing a pop-up seat mounting part includes a pair of rear side members engaged with a floor panel of a vehicle body, the pair of rear side members being spaced apart from each other by a spacing distance, a transverse member having a length corresponding to the spacing distance between the pair of rear side members, the transverse member being connected at opposite ends thereof to ends of upper surfaces of the pair of rear side members, and a back panel in contact with one surface of the transverse member.

19 Claims, 5 Drawing Sheets

VEHICLE BODY STRUCTURE FOR REINFORCING POP-UP SEAT MOUNTING PART

CROSS-REFERENCE TO RELATED APPLICATIONS

This application claims the benefit of Korean Patent Application No. 10-2020-0159501, filed on Nov. 25, 2020, which application is hereby incorporated herein by reference.

TECHNICAL FIELD

The present disclosure relates to a vehicle body structure for reinforcing a pop-up seat mounting part.

BACKGROUND

A conventional vehicle seat is mounted and supported on a floor panel, which constitutes the floor of a passenger compartment in a vehicle body.

A vehicle seat needs to be securely mounted and supported on a floor panel so that an occupant seated therein may feel comfortable. To this end, in the conventional art, separate mounting reinforcement members are used when a vehicle seat is mounted onto a floor panel. Among the vehicle seat mounting reinforcement members, there is a seat cross member, which is formed to extend in the width direction of the vehicle and is mounted on the floor panel. The outer end portion of the seat cross member extending in the width direction of the vehicle is attached to an inner member of a side sill, which is formed to extend in the longitudinal direction of the vehicle, and the inner end portion of the seat cross member extending in the width direction of the vehicle is attached to a tunnel portion of the floor panel.

Side sill members are vehicle body components that are arranged at the outer side of the vehicle in the width direction of the vehicle in order to absorb and dampen an impact applied to the lateral side of the vehicle body in the event of a side collision. In order to increase the rigidity of the side sill members, bulkheads are inserted and mounted in the side sill members.

Furthermore, an inner seat-mounting member and an outer seat-mounting member are provided in order to mount a vehicle seat. The outer seat-mounting member extends in the longitudinal direction of the vehicle, overlaps the outer end portion of the seat cross member, and is attached to the inner surface of the side sill member, which is oriented in the width direction of the vehicle. The inner seat-mounting member extends in the longitudinal direction of the vehicle and overlaps the inner end portion of the seat cross member. Accordingly, the vehicle seat is mounted and supported on the inner seat-mounting member and the outer seat-mounting member. The outer seat-mounting member serves to reinforce the side sill member in order to effectively absorb and disperse an impact applied to the lateral side of the vehicle in the event of a side collision. The inner seat-mounting member serves to disperse the impact energy transferred through the seat cross member in the event of a side collision and to increase the rigidity of the seat cross member.

The seat cross member is usually manufactured using high-strength steel in order to be capable of withstanding a side collision. However, the seat cross member has a problem in that the length of a flange to be bonded to the side sill member is short, making it difficult to engage the same by welding, and thus the connection rigidity between the side sill member and the seat cross member is deteriorated. In addition, because only a portion of the seat cross member is inserted into the bulkhead and the side sill member, the side sill member is not sufficiently reinforced, so it is not possible to effectively withstand a side collision. In addition, the bonding portion between the side sill member and the seat cross member easily buckles in the event of a side collision.

Meanwhile, in general, a seat belt serves to restrain a driver or a passenger in the event of a vehicle collision in order to prevent the driver or the passenger from colliding with a crash pad of the vehicle or being thrown from the vehicle.

A conventional seat belt of a rear seat is mounted such that three ends thereof are respectively connected to left, right and middle tether anchors bolted to a vehicle body. In this case, a cross member and a reinforcement plate are spot-welded in the upward-downward direction to the lower end of a rear floor panel, to which the rear seat is mounted. Therefore, when testing the strength of the middle tether anchor of the seat belt, if the seat belt is pulled in a forward and upward direction, similarly to a vehicle collision, the welded portion of a rear flange of the cross member breaks, which may compromise the safety of a passenger. Further, when a fourth-row pop-up sinking seat is mounted to the rear side of the passenger compartment in the vehicle, there is need to secure sufficient strength of a vehicle body part provided under the opening for the tailgate.

The above information disclosed in this Background section is only for enhancement of understanding of the background of the invention, and therefore it may contain information that does not form the related art that is already known to a person of ordinary skill in the art.

Korean Patent Registration No. 10-0521881 describes information related to the present subject matter.

SUMMARY

The present disclosure relates to a vehicle body structure for reinforcing a pop-up seat mounting part. Particular embodiments relate to a vehicle body structure for reinforcing a pop-up seat mounting part in which a rear side member and a transverse member are directly engaged with each other and a back panel is manufactured using a tailor welded blank.

Embodiments of the present invention can solve problems associated with the related art, and an embodiment of the present invention provides a vehicle body structure for reinforcing a pop-up seat mounting part in which a transverse member and a rear side member are directly engaged with each other, thereby increasing the strength of an anchor of a seat belt for a pop-up seat.

Another embodiment of the present invention provides a vehicle body structure for reinforcing a pop-up seat mounting part in which a rear side member has a 90°-rotated U-shaped cross-section that is open in the outward direction of a vehicle, thereby securing additional space for a sinking well.

The features of embodiments of the present invention are not limited to the above-mentioned features, and other features not mentioned herein will be clearly understood by those skilled in the art from the following description, and will become apparent with reference to the embodiments of the present invention. In addition, features of embodiments of the present invention can be accomplished by the components described in the appended claims and combinations thereof.

One embodiment of the present invention provides a vehicle body structure for reinforcing a pop-up seat mounting part, the vehicle body structure including a pair of rear side members engaged with a floor panel of a vehicle body in the state of being spaced apart from each other, a transverse member formed to have a length corresponding to the spacing distance between the pair of rear side members, the transverse member being connected at opposite ends thereof to the ends of the upper surfaces of the pair of rear side members, and a back panel formed so as to be in contact with one surface of the transverse member.

In a preferred embodiment, each of the pair of rear side members may have a 90°-rotated U-shaped cross-section that is open in the outward direction of the vehicle.

In another preferred embodiment, the back panel may include an upper back panel and a lower back panel arranged in the height direction, and the upper back panel may be engaged with the transverse member so as to form a closed cross-section.

In still another preferred embodiment, at least one of the upper back panel or the lower back panel may be a tailor welded blank.

In yet another preferred embodiment, the vehicle body structure may further include a quarter panel disposed so as to be spaced apart from the upper end of the transverse member and a pair of first brackets connecting the transverse member and the quarter panel.

In still yet another preferred embodiment, the vehicle body structure may further include a pair of second brackets, each of which is in contact with one end of a respective one of the pair of first brackets and the upper surface of the transverse member and connects the transverse member and the quarter panel.

In a further preferred embodiment, each of the pair of second brackets may be formed to have a curvature such that the height thereof gradually decreases from the end thereof that is engaged with the quarter panel to the other end thereof.

In another further preferred embodiment, the vehicle body structure may further include a middle stiffener disposed in the middle of the back panel in order to induce bending deformation of a seat belt anchor of the vehicle.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

Figure 1A:
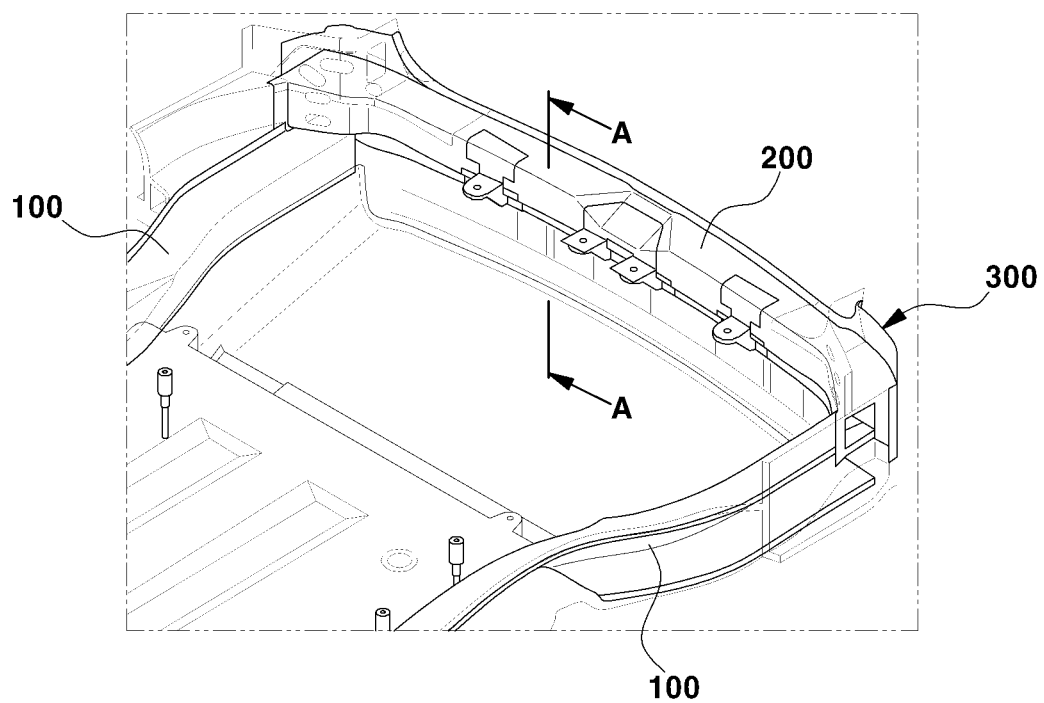
FIG. 1A is a perspective view of a vehicle body structure for reinforcing a pop-up seat mounting part according to an embodiment of the present invention.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Hereinafter, exemplary embodiments of the present invention will be described in detail with reference to the accompanying drawings. The present invention may, however, be embodied in many different forms, and should not be construed as being limited to the embodiments set forth herein. Rather, these embodiments are provided so that the invention will be thorough and complete, and will fully convey the scope of the invention to those skilled in the art.

Further, the terms "upper end" and "lower end" used herein are defined based on a height direction in the drawings.

Further, in the following description, the terms "first" and "second" are used only to avoid confusing designated components, and do not indicate the sequence or importance of the components or the relationships between the components.

A conventional vehicle, equipped with a fourth-row pop-up seat, has a structure in which a transverse member is mounted in the transverse direction of a back panel and a cross member is further provided in order to increase the strength of a seat belt anchor of the fourth-row pop-up seat. The transverse member and the cross member are connected using four seat-mounting brackets, and are in contact with the back panel made from a single material so as to form a closed cross-sectional structure.

In this case, the transverse member is provided at opposite ends thereof with extending parts, which are connected to an opening for a tailgate. In addition, back panel reinforcing members are provided in order to connect the extending parts of the transverse member to rear side members.

In this conventional vehicle body structure, the rear side member is a panel having a U-shaped cross-section, which is a component of a sinking well. Therefore, there is a problem in which the number of components is increased. In addition, when the strength of the seat belt anchor of the fourth-row pop-up seat is estimated, a load is applied to the transverse member in the travel direction of the vehicle. However, the structure composed of the transverse member and the extending parts of the transverse member is not sufficiently robust.

Meanwhile, the cross member does not have high resistance to deformation. That is, the cross member is easily deformed upon deformation of a panel adjacent thereto when a load is applied thereto. In addition, because the number of panels and parts that are adjacent to a sinking well is large, it is difficult to secure sufficient rigidity to withstand surface pressure. In addition, because a large number of parts need to be sealed, there is a high possibility of water leakage, water permeation or the like due to defective sealing.

Therefore, it is required to secure sufficient strength of the seat belt anchor by increasing the strength of the transverse member in the leftward-rightward direction, securing high connectivity of the cross member, or applying a reinforcing member in place of the cross member. In addition, it is required to secure sealing robustness of the vehicle body by reducing the number of panels and parts and to improve driving stability by increasing the strength of a vehicle body part provided under the opening for the tailgate.

Embodiments of the present invention may provide a vehicle body structure for reinforcing a pop-up seat mounting part in which a transverse member 200 is directly engaged with a rear side member wo and a back panel 300 is manufactured using a tailor welded blank, thereby improving a pop-up seat belt anchor.

FIG. 1A is a perspective view of a vehicle body structure for reinforcing a pop-up seat mounting part according to an embodiment of the present invention.

Referring to FIG. 1A, the vehicle body structure for reinforcing a pop-up seat mounting part according to the embodiment of the present invention may comprise a rear side member 100, a transverse member 200, and a back panel 300.

The rear side member 100 may be engaged with the floor panel of the vehicle body. The rear side member 100 may be provided in a pair at the left and right sides of the vehicle body. The pair of rear side members 100 may be arranged at the outer side of the vehicle in the width direction of the vehicle in order to absorb and dampen an impact applied to the rear side of the vehicle body in the event of a collision.

Figure 1B:
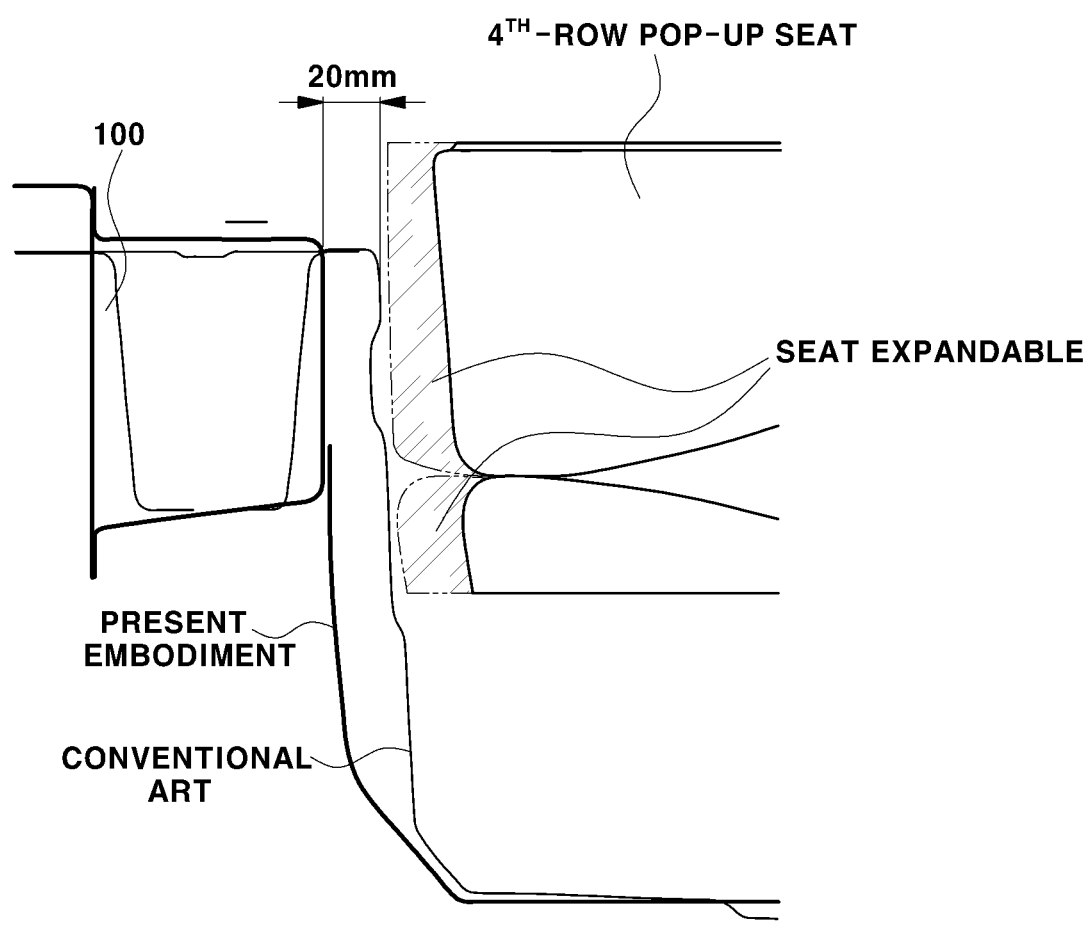
FIG. 1B is a view showing the cross-sectional shape of a rear side member of the vehicle body structure for reinforcing a pop-up seat mounting part according to an embodiment of the present invention.

FIG. 1B is a view showing the cross-sectional shape of the rear side member of the vehicle body structure for reinforcing a pop-up seat mounting part according to an embodiment of the present invention. Referring to FIG. 1B, the rear side member 100 may have a 90°-rotated U-shaped cross-section that is open in the outward direction of the vehicle. Preferably, one end surface of the rear side member 100 is welded to the seat structure in the longitudinal direction, thereby enabling elimination of a welding flange used for height-directional welding, thus increasing the amount of available interior space. Accordingly, it is possible to increase the length of the cushion of the pop-up seat, thus improving ride comfort.

The transverse member 200 may be formed so as to extend in the transverse direction of the vehicle. The transverse member 200 may be located between the pair of rear side members 100. Preferably, the transverse member 200 may be formed to have a length corresponding to the spacing distance between the pair of rear side members 100, and may be connected at opposite ends thereof to the rear ends of the upper surfaces of respective rear side members 100.

The back panel 300 may be formed so as to be in contact with one surface of the transverse member 200. Preferably, the transverse member 200 may extend in the transverse direction inside the vehicle, and the back panel 300 may be formed to correspond to the transverse member 200 so as to be exposed to the outside of the vehicle.

Figure 2:
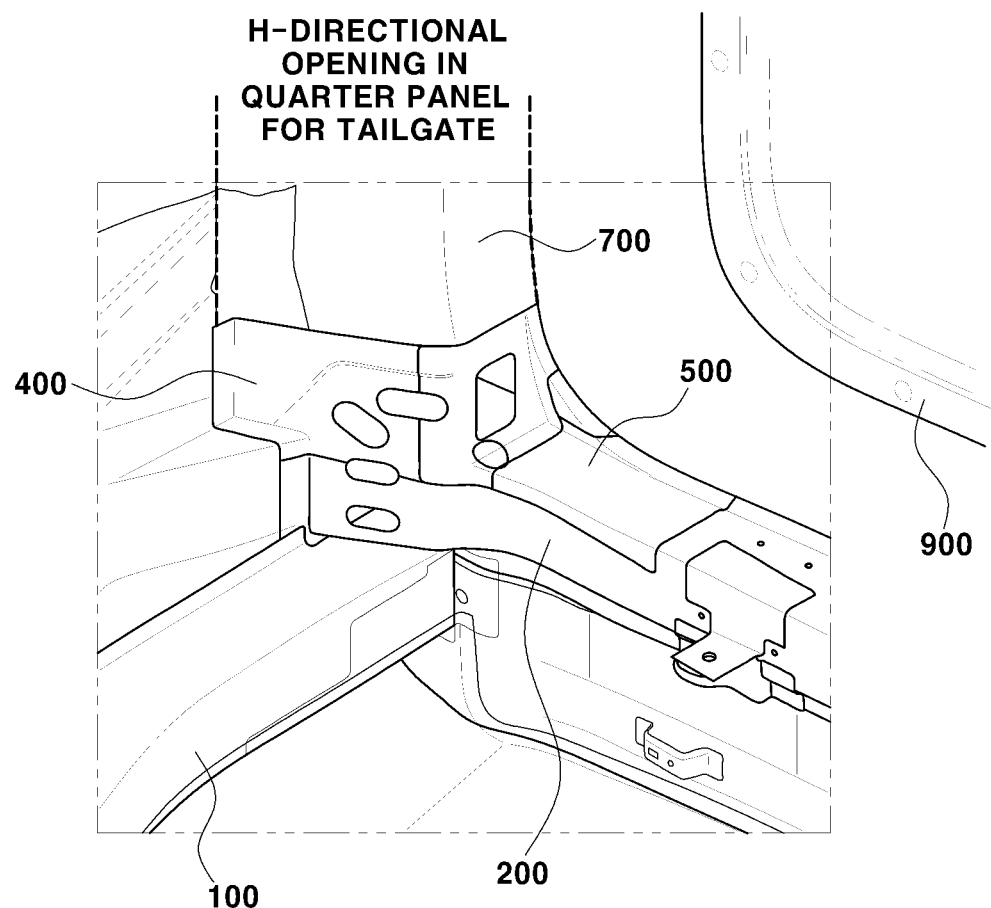
FIG. 2 shows one end of an opening for a tailgate, a first bracket, and a second bracket of the vehicle body structure for reinforcing a pop-up seat mounting part according to an embodiment of the present invention.

FIG. 2 shows one end of an opening for a tailgate 900, a first bracket 400, and a second bracket 500 of the vehicle body structure for reinforcing a pop-up seat mounting part according to an embodiment of the present invention. Referring to FIG. 2, the vehicle body structure for reinforcing a pop-up seat mounting part according to the embodiment of the present invention may further include quarter panels 700, which are disposed so as to be spaced apart from the upper end of the transverse member 200, and may further include a pair of first brackets 400 connecting the transverse member 200 and the quarter panels 700.

The quarter panels 700 may be formed such that the inner surface of the tailgate 900 comes into contact with the quarter panels 700 when the tailgate 900 is closed. The quarter panels 700 may be frames that are located at opposite side portions of the opening in the rear surface of the vehicle body when the tailgate goo is open. The first bracket 400 may be disposed such that one surface thereof is oriented toward the front surface of the vehicle and is engaged with the end of the quarter panel 700.

The vehicle body structure for reinforcing a pop-up seat mounting part according to the embodiment of the present invention may further include a pair of second brackets 500, each of which is in contact with one end of the first bracket 400 and the upper surface of the transverse member 200 and connects the transverse member 200 and the quarter panel 700. The pair of second brackets 500 may be located at opposite side portions of the opening in the rear surface of the vehicle body when the tailgate goo is open. Each of the pair of second brackets 500 may be connected to one side surface of a respective one of the pair of first brackets 400, and may cover at least a portion of the upper surface of the transverse member 200.

The second bracket 500 may be disposed such that one surface thereof is oriented toward the side surface of the vehicle and is engaged with the end of the quarter panel 700. Preferably, the second bracket 500 may be formed to have a curvature such that the height thereof gradually decreases from the end thereof that is engaged with the quarter panel 700 to the other end thereof. The second bracket 500 may be formed such that one side surface thereof is oriented toward the inner side surface of the vehicle and the lower surface thereof is in surface engagement with the transverse member 200, thereby increasing the rigidity of the vehicle body.

Figure 3:
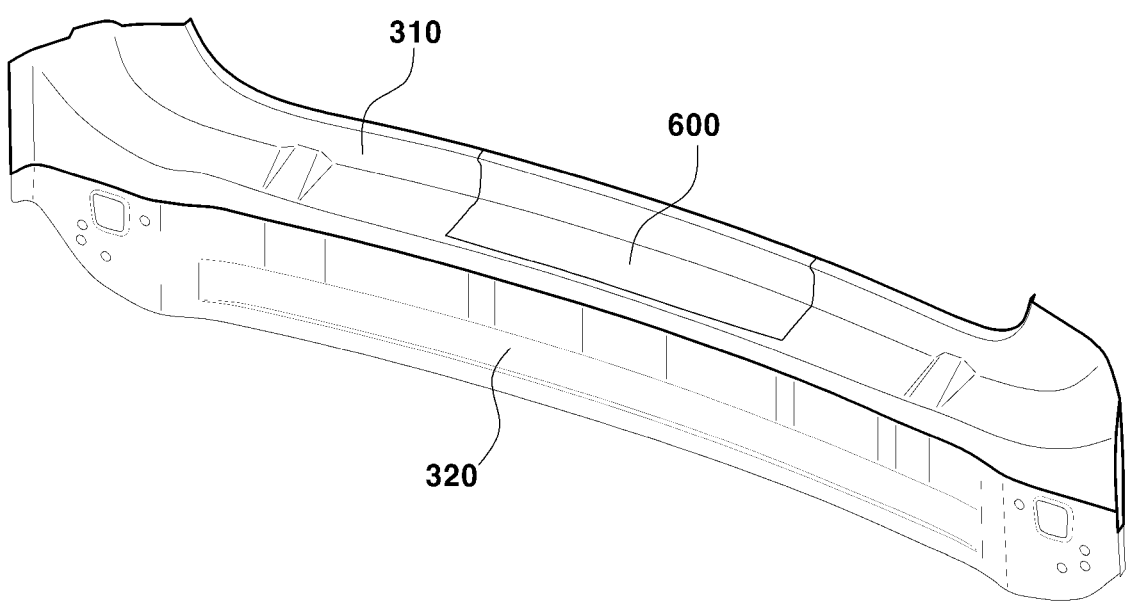
FIG. 3 is a view showing a back panel and a middle stiffener of the vehicle body structure for reinforcing a pop-up seat mounting part according to an embodiment of the present invention.
Figure 4:
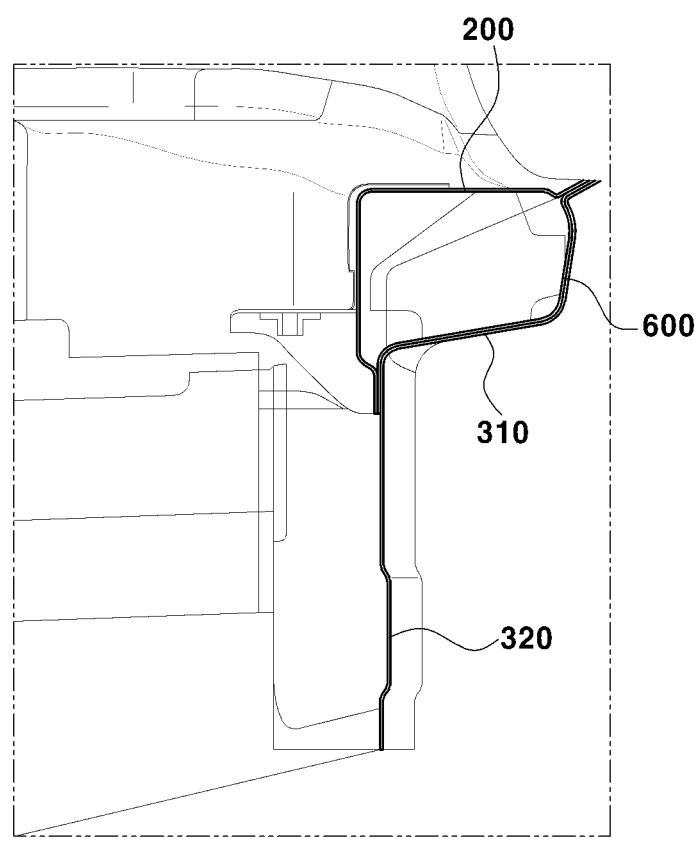
FIG. 4 is a cross-sectional view taken along line A-A in the vehicle body structure for reinforcing a pop-up seat mounting part according to an embodiment of the present invention shown in FIG. 1A.

FIG. 3 is a view showing a back panel and a middle stiffener of the vehicle body structure for reinforcing a pop-up seat mounting part according to an embodiment of the present invention, and FIG. 4 is a cross-sectional view taken along line A-A in the vehicle body structure for reinforcing a pop-up seat mounting part according to the embodiment of the present invention shown in FIG. 1A.

Referring to FIGS. 3 and 4, the back panel 300 of the vehicle body structure for reinforcing a pop-up seat mounting part according to the embodiment of the present invention may include an upper back panel 310 and a lower back panel 320, which are arranged in the height direction. The upper back panel 310 may be engaged with the transverse member 200 so as to form a closed cross-section. Further, at least one of the upper back panel 310 or the lower back panel 320 may be embodied as a tailor welded blank.

The upper back panel 310 may have higher strength than the lower back panel 320. Furthermore, the upper back panel 310 may extend in the width direction of the vehicle, and may be engaged with the transverse member 200. The transverse member 200 and the upper back panel 310 may form a closed cross-section in the state of being engaged with each other.

A tailor welded blank (hereinafter referred to as a "TWB") is a single blank sheet made by cutting steel sheets having different thicknesses, strengths or material properties to an appropriate size and welding the same through, for example, laser welding. Such a TWB is mainly used for parts for reinforcing a vehicle body.

The upper back panel 310 or the lower back panel 320 of embodiments of the present invention may be processed through a TWB processing method, so a stiffener for connecting metal panels is not necessary, thereby reducing the weight of the vehicle body. The upper back panel 310 and the lower back panel 320 may be made by welding sheets having different thicknesses, i.e. relatively thin sheets and relatively thick sheets.

Referring to FIG. 4, the vehicle body structure for reinforcing a pop-up seat mounting part according to the embodiment of the present invention may further include a middle stiffener 600, which is disposed in the middle of the back panel and serves to induce bending deformation of the seat belt anchor of the vehicle.

Preferably, the middle stiffener 600 may be formed in the middle of the upper back panel 310. In the state in which the transverse member 200 and the upper back panel 310 are engaged with each other, the cross-section of the middle stiffener 600 may be located inside the closed cross-section formed by the transverse member 200 and the upper back panel 310. The cross-section of the middle stiffener 600 taken along line A-A may have a shape corresponding to that of the upper back panel 310.

As is apparent from the above description, embodiments of the present invention provide the following effects through the above embodiments and through the configurations and combination and use relationships described above.

Since the transverse member and the rear side member are directly engaged with each other and the back panel is manufactured using a tailor welded blank, it is possible to increase the strength of the anchor of the seat belt for the pop-up seat.

In addition, since the rear side member has a 90°-rotated U-shaped cross-section that is open in the outward direction of a vehicle, it is possible to secure additional space for a sinking well.

The above description is illustrative of embodiments of the present invention. Also, the above disclosure is intended to illustrate and explain preferred embodiments of the present invention, and the present invention may be used in various other combinations, modifications, and environments. In other words, the present invention may be changed or modified within the scope of the concept of the invention disclosed herein, within the equivalent scope of the disclosure, and/or within the skill and knowledge of the art. The described embodiments illustrate the best state of the art to implement the technical idea of the present invention, and various changes may be made thereto as demanded for specific applications and uses of the present invention. Accordingly, the above description is not intended to limit the present invention to the embodiments. Also, the appended claims should be construed as encompassing such other embodiments.

What is claimed is:

1. A vehicle body structure for reinforcing a pop-up seat mounting part, the vehicle body structure comprising:
    a pair of rear side members engaged with a floor panel of a vehicle body, the pair of rear side members being spaced apart from each other by a spacing distance;
    a transverse member having a length corresponding to the spacing distance between the pair of rear side members, the transverse member being connected at opposite ends thereof to ends of upper surfaces of the pair of rear side members;
    a back panel in contact with one surface of the transverse member, wherein the back panel comprises an upper back panel and a lower back panel arranged in a height direction and wherein the upper back panel is engaged with the transverse member so as to form a closed cross-section; and
    a middle stiffener disposed in a middle of the back panel wherein the middle stiffener is located inside the closed cross-section formed by the transverse member and the upper back panel.

2. The vehicle body structure of claim 1, wherein each of the pair of rear side members has a U-shaped cross-section that is open in an outward direction of the vehicle body.

3. The vehicle body structure of claim 1, wherein at least one of the upper back panel or the lower back panel is a tailor welded blank.

4. A vehicle body structure for reinforcing a pop-up seat mounting part, the vehicle body structure comprising:
    a pair of rear side members engaged with a floor panel of a vehicle body, the pair of rear side members being spaced apart from each other by a spacing distance;
    a transverse member having a length corresponding to the spacing distance between the pair of rear side members, the transverse member being connected at opposite ends thereof to ends of upper surfaces of the pair of rear side members;
    a back panel in contact with one surface of the transverse member, wherein the back panel comprises an upper back panel and a lower back panel arranged in a height direction and wherein the upper back panel is engaged with the transverse member so as to form a closed cross-section;
    a quarter panel disposed at an upper end of the transverse member;
    a pair of first brackets connecting the transverse member and the quarter panel; and
    a middle stiffener disposed in a middle of the back panel, wherein the middle stiffener is located inside the closed cross-section formed by the transverse member and the upper back panel.

5. The vehicle body structure of claim 4, further comprising a pair of second brackets, each bracket of the pair of second brackets being in contact with one end of a respective one of the pair of first brackets and an upper surface of the transverse member and connecting the transverse member and the quarter panel.

6. The vehicle body structure of claim 5, wherein each bracket of the pair of second brackets has a curvature such that a height thereof gradually decreases from a first end of the second bracket that is engaged with the quarter panel to a second end of the second bracket.

7. The vehicle body structure of claim 4, wherein each of the pair of rear side members has a U-shaped cross-section that is open in an outward direction of the vehicle body.

8. A vehicle comprising:
a vehicle body comprising a floor panel and a tailgate;
a pair of rear side members engaged with the floor panel, the pair of rear side members being spaced apart from each other by a spacing distance;
a transverse member having a length corresponding to the spacing distance between the pair of rear side members, the transverse member being connected at opposite ends thereof to ends of upper surfaces of the pair of rear side members; and
a back panel in contact with one surface of the transverse member, wherein the back panel comprises an upper back panel and a lower back panel arranged in a height direction and wherein the upper back panel is engaged with the transverse member so as to form a closed cross-section; and
a pop-up seat mounted to the vehicle body; and
a middle stiffener disposed in a middle of the back panel, wherein the middle stiffener is located inside the closed cross-section formed by the transverse member and the upper back panel.

9. The vehicle of claim 8, wherein each of the pair of rear side members has a U-shaped cross-section that is open in an outward direction of the vehicle.

10. The vehicle of claim 8, wherein at least one of the upper back panel or the lower back panel is a tailor welded blank.

11. The vehicle of claim 8, further comprising:
a quarter panel disposed at an upper end of the transverse member, wherein an inner surface of the tailgate is in contact with the quarter panel when the tailgate is in a closed state; and
a pair of first brackets connecting the transverse member and the quarter panel.

12. The vehicle of claim 11, further comprising a pair of second brackets, each bracket of the pair of second brackets being in contact with one end of a respective one of the pair of first brackets and an upper surface of the transverse member and connecting the transverse member and the quarter panel.

13. The vehicle of claim 12, wherein each bracket of the pair of second brackets has a curvature such that a height thereof gradually decreases from a first end of the second bracket that is engaged with the quarter panel to a second end of the second bracket.

14. The vehicle body structure of claim 2, wherein at least one of the upper back panel or the lower back panel is a tailor welded blank.

15. The vehicle body structure of claim 4, wherein at least one of the upper back panel or the lower back panel is a tailor welded blank.

16. The vehicle of claim 9, wherein at least one of the upper back panel or the lower back panel is a tailor welded blank.

17. The vehicle of claim 9, further comprising:
a quarter panel disposed at an upper end of the transverse member, wherein an inner surface of the tailgate is in contact with the quarter panel when the tailgate is in a closed state; and
a pair of first brackets connecting the transverse member and the quarter panel.

18. The vehicle of claim 17, further comprising a pair of second brackets, each bracket of the pair of second brackets being in contact with one end of a respective one of the pair of first brackets and an upper surface of the transverse member and connecting the transverse member and the quarter panel.

19. The vehicle of claim 18, wherein each bracket of the pair of second brackets has a curvature such that a height thereof gradually decreases from a first end of the second bracket that is engaged with the quarter panel to a second end of the second bracket.

* * * * *